(12) United States Patent
Lee et al.

(10) Patent No.: US 10,137,511 B2
(45) Date of Patent: Nov. 27, 2018

(54) APPARATUS FOR ATTACHING/DETACHING AN INSERT TO/FROM CUTTING TOOL

(71) Applicant: KORLOY INC., Seoul (KR)

(72) Inventors: Sun-Kyoo Lee, Cheongju-si (KR); Dong-Ryong Ji, Cheongju-si (KR); Young-Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 209 days.

(21) Appl. No.: 15/108,897

(22) PCT Filed: Nov. 7, 2014

(86) PCT No.: PCT/KR2014/010671
§ 371 (c)(1),
(2) Date: Jun. 29, 2016

(87) PCT Pub. No.: WO2015/108270
PCT Pub. Date: Jul. 23, 2015

(65) Prior Publication Data
US 2016/0325364 A1 Nov. 10, 2016

(30) Foreign Application Priority Data
Jan. 17, 2014 (KR) .......................... 10-2014-0006279

(51) Int. Cl.
*B23B 27/16* (2006.01)
*B23C 5/22* (2006.01)
(Continued)

(52) U.S. Cl.
CPC ............ *B23C 5/2273* (2013.01); *B23B 27/16* (2013.01); *B23C 5/06* (2013.01); *B23C 5/20* (2013.01); *B23C 5/22* (2013.01); *B23C 2210/168* (2013.01)

(58) Field of Classification Search
CPC ... B23C 5/2265; B23C 5/2437; B23C 5/2441; B23C 5/2269
See application file for complete search history.

(56) References Cited

U.S. PATENT DOCUMENTS

| | | | | |
|---|---|---|---|---|
| 830,779 | A * | 9/1906 | Geer ..................... | B23C 5/2265 407/49 |
| 3,320,655 | A * | 5/1967 | Schweitzer, Sr. ..... | B23C 5/2265 407/37 |

(Continued)

FOREIGN PATENT DOCUMENTS

| KR | 20-0390380 Y1 | 7/2005 |
|---|---|---|
| KR | 10-0721900 B1 | 5/2007 |

(Continued)

*Primary Examiner* — Will Fridie, Jr.
(74) *Attorney, Agent, or Firm* — Rabin & Berdo, P.C.

(57) ABSTRACT

A technical object is to provide an apparatus for attaching or detaching an insert of a cutting tool, which enables easy and fast replacement of the insert. To this end, the apparatus for attaching or detaching the insert to or from a body of the cutting tool is provided in the body of the insert and includes an insert receiving portion formed in the body of the cutting tool to receive the insert therein, a wedge receiving portion formed in the body of the cutting tool continuously after the insert receiving portion, a wedge received in the wedge receiving portion, and a rotating unit configured to rotate the wedge in a first direction that faces the insert receiving portion, or to a second direction opposite the first direction.

10 Claims, 12 Drawing Sheets

(51) Int. Cl.
  *B23C 5/06* (2006.01)
  *B23C 5/20* (2006.01)

(56) References Cited

U.S. PATENT DOCUMENTS

| | | | |
|---|---|---|---|
| 3,831,237 A * | 8/1974 | Gunsalus | B23C 5/207 407/104 |
| 4,164,380 A * | 8/1979 | Peters | B23C 5/2441 407/36 |
| 4,329,091 A * | 5/1982 | Erkfritz | B23C 5/2441 407/108 |
| 8,262,323 B2 | 9/2012 | Satran et al. | |
| 2002/0110428 A1* | 8/2002 | Noggle | B23C 5/2441 407/36 |
| 2007/0183857 A1 | 8/2007 | Wihlborg | |
| 2007/0256287 A1* | 11/2007 | Kocherovsky | B23C 5/207 29/428 |
| 2009/0238650 A1* | 9/2009 | Jansson | B23C 5/2208 407/102 |
| 2012/0082522 A1 | 4/2012 | Hecht et al. | |
| 2015/0273589 A1* | 10/2015 | Hoffer | B23B 27/10 407/11 |

FOREIGN PATENT DOCUMENTS

| | | |
|---|---|---|
| KR | 10-1299756 B1 | 8/2013 |
| KR | 10-2013-0137168 A | 12/2013 |

\* cited by examiner

Fig. 1

Prior art

Fig. 2

Prior art

APPARATUS FOR ATTACHING/DETACHING AN INSERT TO/FROM CUTTING TOOL

TECHNICAL FIELD

The present disclosure relates to an apparatus provided on a body of a cutting tool to attach or detach an insert to or from the body of the cutting tool.

BACKGROUND ART

Generally, a cutting tool with an insert fastened thereto is mounted on a machine tool to be used for cutting a workpiece composed of ferrous and nonferrous metals, nonmetal materials, and so on.

The cutting tool includes an insert attaching/detaching apparatus that fastens the insert.

Figure 1:
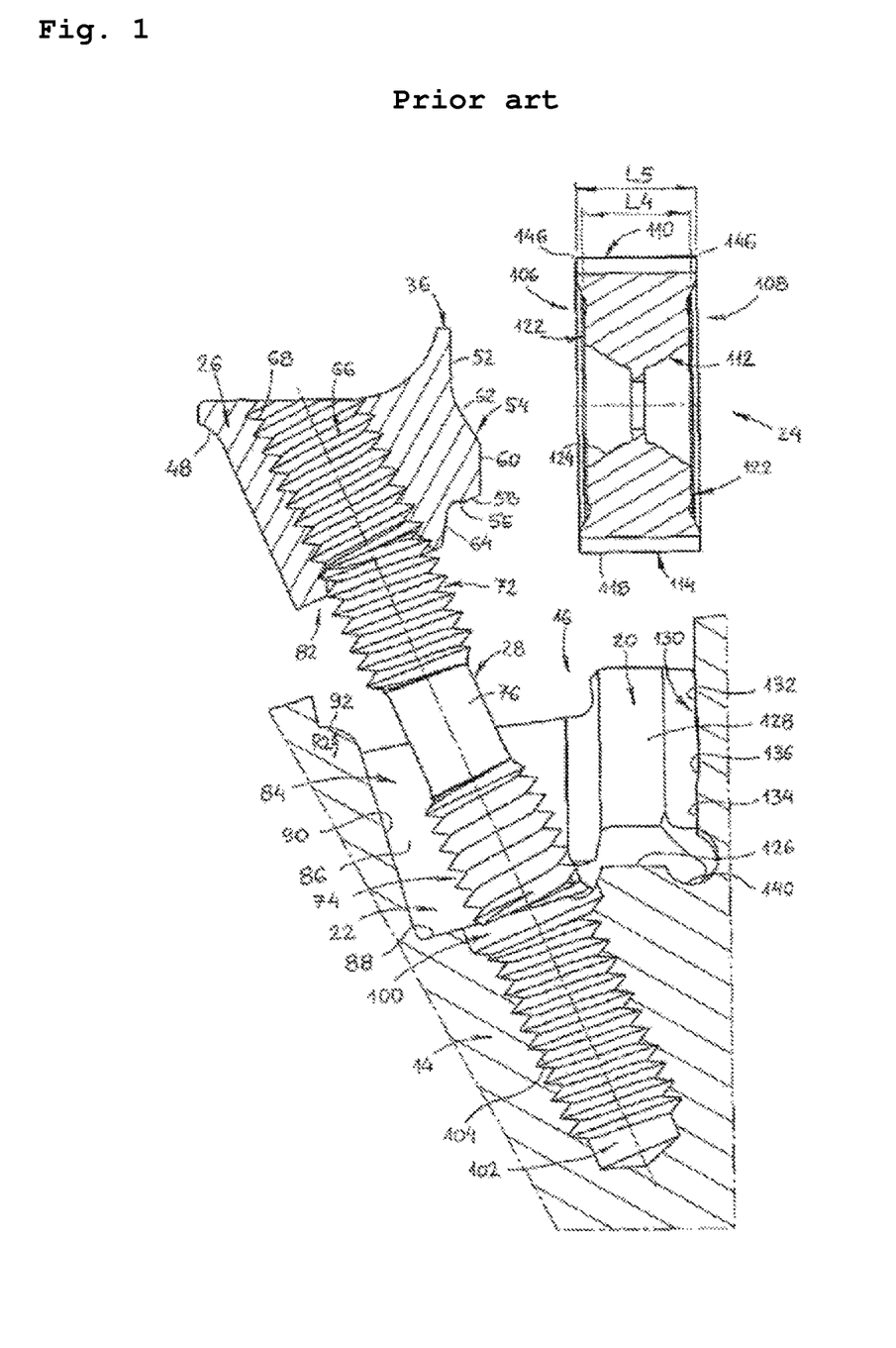
FIG. 1 is a cross sectional view illustrating an insert being detached by a conventional insert attaching/detaching apparatus of a cutting tool.
Figure 2:
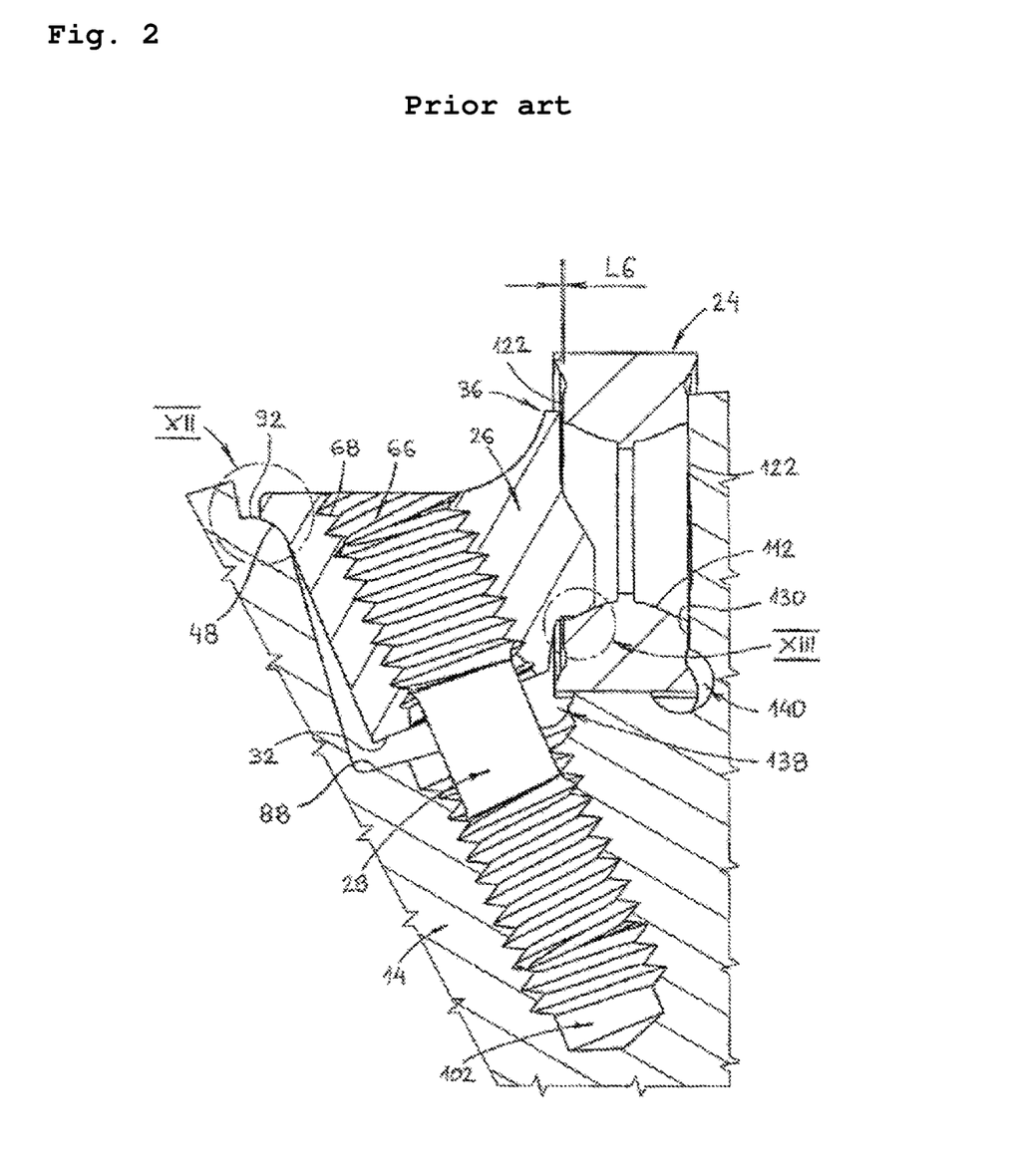
FIG. 2 is a cross sectional view illustrating the insert being attached by the insert attaching/detaching apparatus of the cutting tool of FIG. 1.

An example of the conventional technology is disclosed in U.S. Pat. No. 8,262,323 which describes an insert attaching/detaching apparatus of a cutting tool including, as illustrated in FIGS. 1 and 2, an insert pocket 20 that receives an insert 24, a clamp arm pocket 22 formed in continuance with the insert pocket 20, a clamp arm 26 received in the clamp arm pocket 22 to retain the insert 24, a first threaded bore 66 formed through the clamp arm 26, a second threaded bore 102 formed on a bottom surface of the clamp arm pocket 22 on the same axis as the first threaded bore 66, and a screw 28 engaged in the first and second threaded bores 66, 102. Specifically, the first and second threaded bores 66, 102 have threads in directions opposite the other, and the threads of the upper end 72 and the lower end 74 of the screw 28 are accordingly formed in opposite directions.

Hereinbelow, a process of attaching or detaching the insert to or from the cutting tool will be described with reference to FIGS. 1 and 2.

First, the process of attaching the insert 24 to the cutting tool will be described. As illustrated in FIG. 1, the insert 24 is seated in the insert pocket 20, after which the upper end 72 of the screw 28 is threadingly engaged by a predetermined amount to the first threaded bore 66 of the clamp arm 26, and then the screw 28 is rotated in a forward direction. As a result, the screw 28 is continuously inserted by the thread engagement with the second threaded bore 102, and at the same time, the clamp arm 26 is moved to the center of the screw 28 such that the insert 24 is securely retained by the clamp arm 26, as illustrated in FIG. 2.

The process of detaching the insert 24 from the cutting tool will now be described below. In the attached state as illustrated in FIG. 2, when the screw 28 is rotated in the reverse direction, the screw 28 is withdrawn from the second threaded bore 102 and at the same time, the clamp arm 26 is moved from the center 76 to the upper end 72. Then as the screw 28 is continuously rotated, as illustrated in FIG. 1, the clamp arm 26 is moved farther away from the insert 24 and the tool holder such that a gap is generated for detachment of the insert 24. Accordingly, the insert 24 is detached through the gap.

However, the conventional insert attaching/detaching apparatus of the cutting tool has a technical configuration that generates a gap for the insert 24 to be attached or detached therethrough, only with the movement of the clamp arm 26 according to rotation of the screw 28. Accordingly, when the insert 24 has an increased cutting edge, this means that it is necessary to rotate the screw 28 more in order to generate the gap. Accordingly, there is a problem that increased time is necessary to attach or detach (i.e., replace) the insert 24.

DISCLOSURE OF INVENTION

Technical Problem

A technical object of the present disclosure is to provide an apparatus for attaching or detaching an insert of a cutting tool, which enables easy and fast replacement of the insert.

Solution to Problem

To achieve the above purpose, an apparatus provided on a body of a cutting tool is provided for attaching or detaching an insert to or from the body of the cutting tool, including an insert receiving portion formed in the body of the cutting tool to receive the insert therein, a wedge receiving portion formed in the body of the cutting tool continuously after the insert receiving portion, a wedge received in the wedge receiving portion, and a rotating unit configured to rotate the wedge in a first direction that faces the insert receiving portion, or to a second direction opposite the first direction.

The rotating unit may include a wedge screw hole formed through the wedge, a screw screw-engaged in the wedge screw hole, a bottom through hole formed in a bottom surface of the wedge receiving portion, the bottom through hole through which the screw is passed, a hinge receiving portion formed in communication with the bottom through hole to serve as a center of rotation of the wedge, and a hinge provided in the hinge receiving portion with one side being rotatable, and screw-engaged with the screw.

The rotating unit may additionally include a space to provide a clearance for the rotation of the wedge, when the wedge, in a loosened state, is rotated to the second direction.

The space may include a first uneven surface formed on a surface of the wedge receiving portion that is placed in the second direction, and a second uneven surface formed on a surface of the wedge facing the second direction in order to correspond to the first uneven surface.

The wedge may be in loosened state, the first and second uneven surfaces may be meshed with each other, thus forming the clearance for the rotation, and when the wedge is in tightened state, the first and second uneven surfaces are not meshed with each other, thus pressing the insert.

For example, the hinge may include a hinge member rotatably provided in the hinge receiving portion, and an engage screw hole formed in the hinge member for screw-engagement with the screw.

In the above example, the bottom through hole may be formed in a size that allows the screw to rotate while the wedge is being rotated about the hinge member and advanced through the space.

Further, the wedge screw hole, the bottom through hole, and the engage screw hole may be placed on a same line through the screw, and the hinge receiving portion and the hinge member may be placed vertically to the screw.

In another example, the hinge may include a hinge pin rotatably provided in the hinge receiving portion, a connect member received in the bottom through hole to connect the hinge pin with the screw, a first connect screw hole formed on one side of the connect member such that the screw is screw-engaged therewith, and a second connect screw hole formed on the other side of the connect member such that the hinge pin is screw-engaged therewith.

In this example, the bottom through hole may be formed in a size that allows the connect member to rotate while the wedge is being rotated about the hinge pin and advanced through the space.

Further, the wedge screw hole, the bottom through hole, and the first connect screw hole may be placed on a same line through the screw, and the hinge receiving portion, the hinge pin, and the second connect screw hole may be placed vertically to the screw.

Effect of the Disclosure

As described above, an apparatus for attaching or detaching an insert of a cutting tool according to various embodiments can provide the following effects.

According to various embodiments, a technical configuration is provided, in which the wedge is rotated in the wedge receiving portion by the rotating unit. Accordingly, it is possible to replace the insert easily and rapidly, by way of rotating the wedge that retains the insert.

BEST MODE

Hereinbelow, exemplary embodiments of the present disclosure will be described in detail with reference to the accompanying drawings to enable those skilled in the art to easily work the present disclosure. However, the present disclosure can be implemented in several different forms, and not to be limited to certain embodiments described herein.

Figure 3:
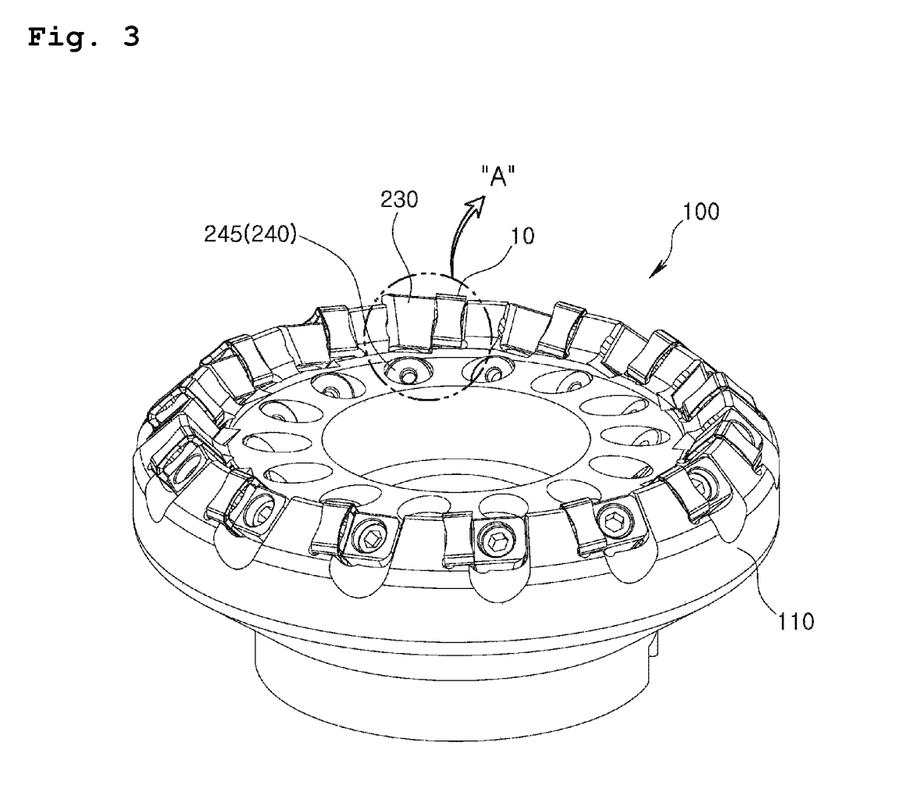
FIG. 3 is a schematic perspective view of a cutting tool including an apparatus for attaching or detaching an insert of a cutting tool, according to an exemplary embodiment of the present disclosure.
Figure 4:
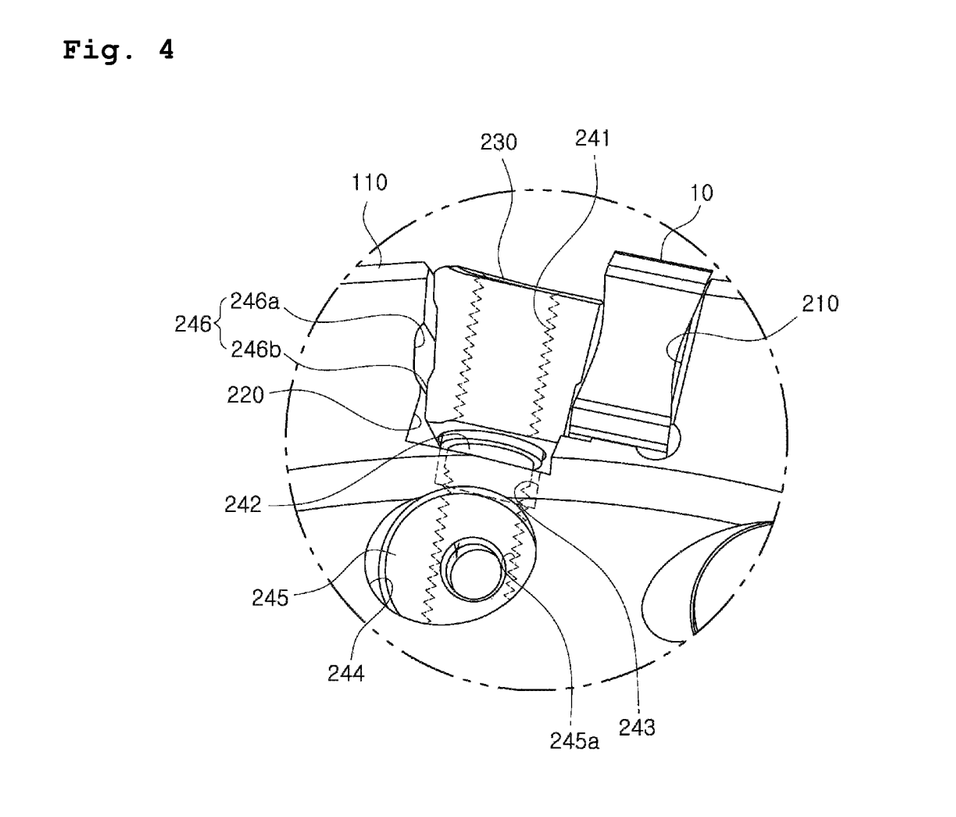
FIG. 4 is an expanded view illustrating the encircled area "A" (i.e., apparatus for attaching or detaching insert) of FIG. 3 in enlargement.
Figure 5:
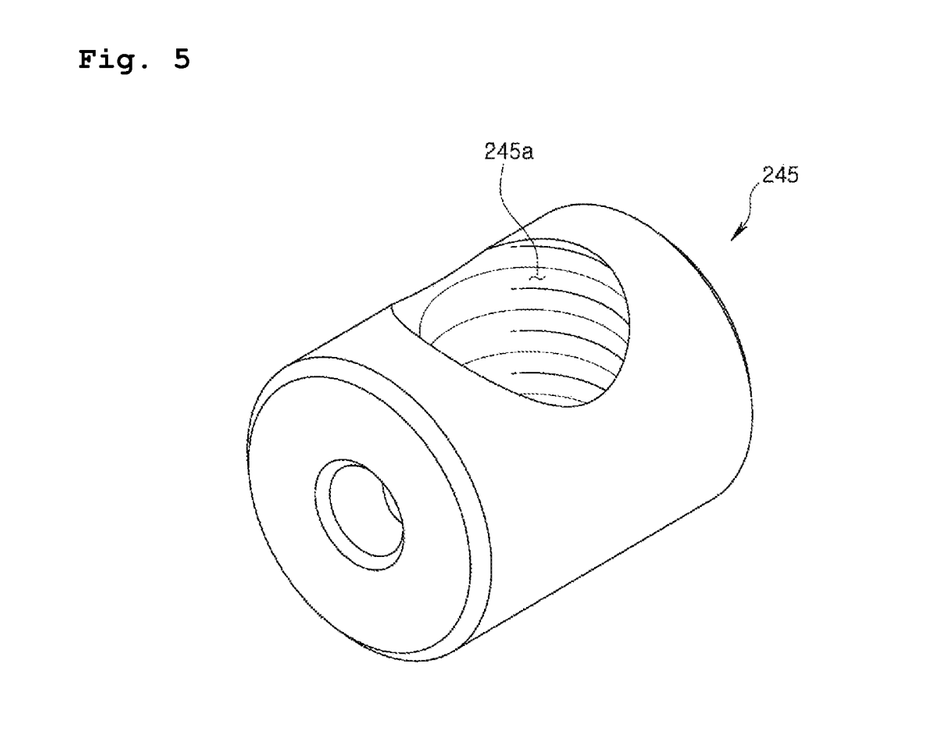
FIG. 5 is a perspective view illustrating a hinge of the apparatus for attaching or detaching insert of FIG. 4.

FIG. 3 is a schematic perspective view of a cutting tool including an apparatus for attaching or detaching an insert of a cutting tool, according to an exemplary embodiment of the present disclosure, FIG. 4 is an expanded view illustrating the encircled area "A" (i.e., apparatus for attaching or detaching insert) of FIG. 3 in enlargement, and FIG. 5 is a perspective view illustrating a hinge member of the apparatus for attaching or detaching insert of FIG. 4.

As illustrated in FIGS. 3 to 5, the apparatus for attaching or detaching an insert of a cutting tool according to an exemplary embodiment is an apparatus for attaching or detaching an insert 10 provided in a body 110 of a cutting tool (e.g., milling cutter), and includes an insert receiving portion 210, a wedge receiving portion 220, a wedge 230, and a rotating unit 240.

As illustrated in FIGS. 3 and 4, the insert receiving portion 210 is formed in the cutting tool body 110 and receives the insert 10. For example, the insert receiving portion 210 may be formed as a groove along an edge of the cutting tool body 110, Further, the insert receiving portion 210 may take a form approximately corresponding to the insert 10 in order to prevent movement of the insert 10 in left and right directions, once the insert 10 is pressed by the wedge 230.

As illustrated in FIGS. 3 and 4, the wedge receiving portion 220 is formed in the cutting tool body 110, continuously after the insert receiving portion 210. The wedge receiving portion 220 receives the wedge 230. For example, the wedge receiving portion 220 may be formed as a groove along an edge of the cutting tool body 110, like the insert receiving portion 210. Further, the wedge receiving portion 220 may take a shape that approximately corresponds to the wedge 230.

As illustrated in FIGS. 3 and 4, the wedge 230 is received in the wedge receiving portion 220, and plays a role of retaining the insert 10 in the insert receiving portion 210 while pressing the insert 10 received in the insert receiving portion 210.

The rotating unit 240 plays a role of rotating the wedge 230 to a first direction facing the insert receiving portion 210, or to a second direction opposite the first direction. Accordingly, while the insert 10 is being attached or detached, it is possible to rotate the wedge 230 in the second direction (see FIG. 7) to thus easily and rapidly form a gap to allow attachment or detachment of the insert 10, and once the insert 10 is received in the insert receiving portion 210, it is possible to rotate the wedge 230 in the first direction (see FIG. 6) to thus securely retain the insert 10.

Hereinbelow, the rotating unit 20 will be described in greater detail with reference to FIGS. 4 and 5.

For example, as illustrated in FIGS. 4 and 5, the rotating unit 240 may include a wedge screw hole 241, a screw 242, a bottom through hole 243, a hinge receiving portion 244, and a hinge 245.

As illustrated in FIG. 4, the wedge screw hole 241 is formed through the wedge 230. Specifically, the wedge screw hole 241 is formed in communication with the bottom through hole 243 and an engaging screw hole 245b such that the screw 242 is screw-engaged with the wedge screw hole 241, passed through the bottom through hole 243, and then screw-engaged with the engaging screw hole 245b of the hinge 245.

As illustrated in FIG. 4, the screw 242 is screw-engaged in the wedge screw hole 241. Specifically, the wedge 230 is retained in the wedge receiving portion 220 in a manner in which the screw 242 is screw-engaged in the wedge screw hole 241, directly passed through the bottom through hole 243, i.e., without being screw-engaged, and then screw-engaged in the engaging screw hole 245b of the hinge 245.

As illustrated in FIG. 4, the bottom through hole 243 is formed on a bottom surface of the wedge receiving portion 220 to allow the screw 242 to pass therethrough, and has a greater size than the screw 242. For example, in order to construct a greater-size structure, the bottom through hole 243 may be designed to have a greater inner diameter than the outer diameter of the screw 242. Further, the bottom through hole 243 is located between the wedge screw hole 241 and the engaging screw hole 245b of the hinge 245 such that the bottom through hole 243 plays a role of connecting the wedge screw hole 241 with the engaging screw hole 245b.

As illustrated in FIG. 4, the hinge receiving portion 244 is formed in communication with the bottom through hole 243 and serves as a center of rotation of the wedge 230. For example, the hinge receiving portion 244 may take a form of a cylindrical groove, and may be formed in an approximately vertical relationship with the bottom through hole 243.

As illustrated in FIG. 4, the hinge 245 is provided in the hinge receiving portion 244, rotatably at one side thereof. As illustrated in FIG. 5, the hinge 245 includes a hinge member 245a directly and rotatably received in the hinge receiving portion 244, and an engaging screw hole 245b formed on the hinge member 245a for screw-engagement with the screw 242. For example, as illustrated in FIGS. 4 and 5, when the hinge receiving portion 244 has a cylindrical groove form, the hinge member 245a may accordingly have a cylindrical shape.

Furthermore, as illustrated in FIG. 4, the rotating unit 240 described above may additionally include a space 246. The space 246 plays a role of providing a clearance for the rotation of the wedge 230, when the wedge 230 is rotated from the loosened state to the second direction. For example, as illustrated in FIG. 4, such space 246 may include first and second uneven surfaces 246a, 246b. The first uneven surface 246a is formed on a surface of the wedge receiving portion 220 that is in the second direction, and the second uneven surface 246b is formed on a surface of the wedge 230 that is in the second direction to correspond to the first uneven surface 246a. Specifically, when the wedge 230 is in loosened state, the first and second uneven surfaces 246a, 246b may be meshed with each other to thus generate a clearance for the rotation (see FIG. 7), or when the wedge 230 is in tightened state, the first and second uneven surfaces 246a, 246b may be out of the mesh to thus press the insert 10 (see FIG. 6).

Further, the bottom through hole 243 may be formed in a size that allows the screw 242 to rotate while the wedge 230 is being advanced through the space 246 in rotating movement about the hinge member 245a.

Further, the wedge screw hole 241, the bottom through hole 243, and the engaging screw hole 245b may be placed on the same line through the screw 242, and the hinge receiving portion 244 and the hinge member 245a may be placed approximately vertically with respect to the screw 242.

Hereinbelow, an operation of an apparatus for attaching or detaching an insert of a cutting tool according to an exemplary embodiment of the present disclosure will be described.

Figure 6:
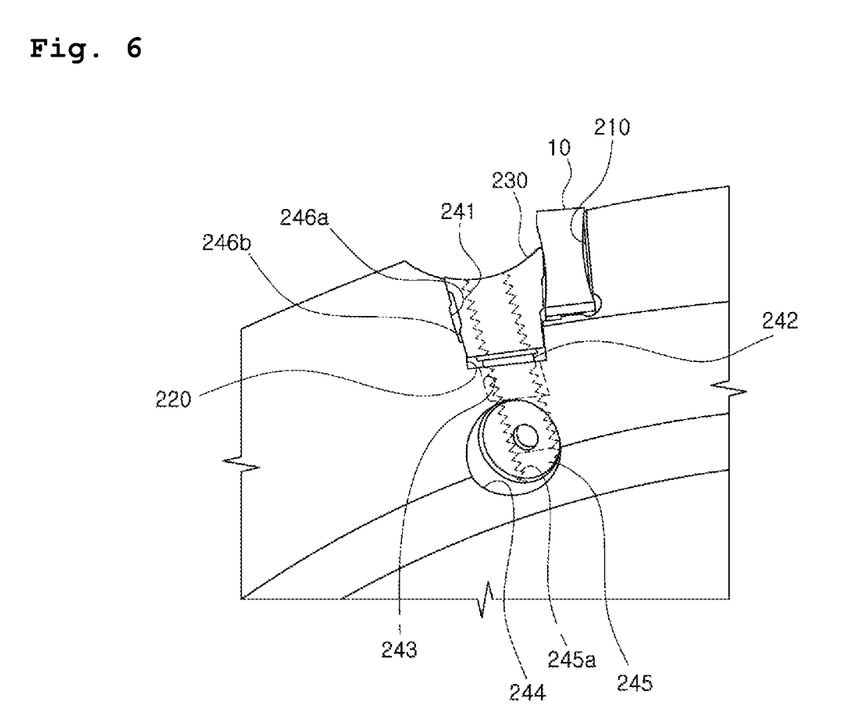
FIG. 6 is a view illustrating an insert being attached by the apparatus for attaching or detaching insert of FIG. 3.
Figure 7:
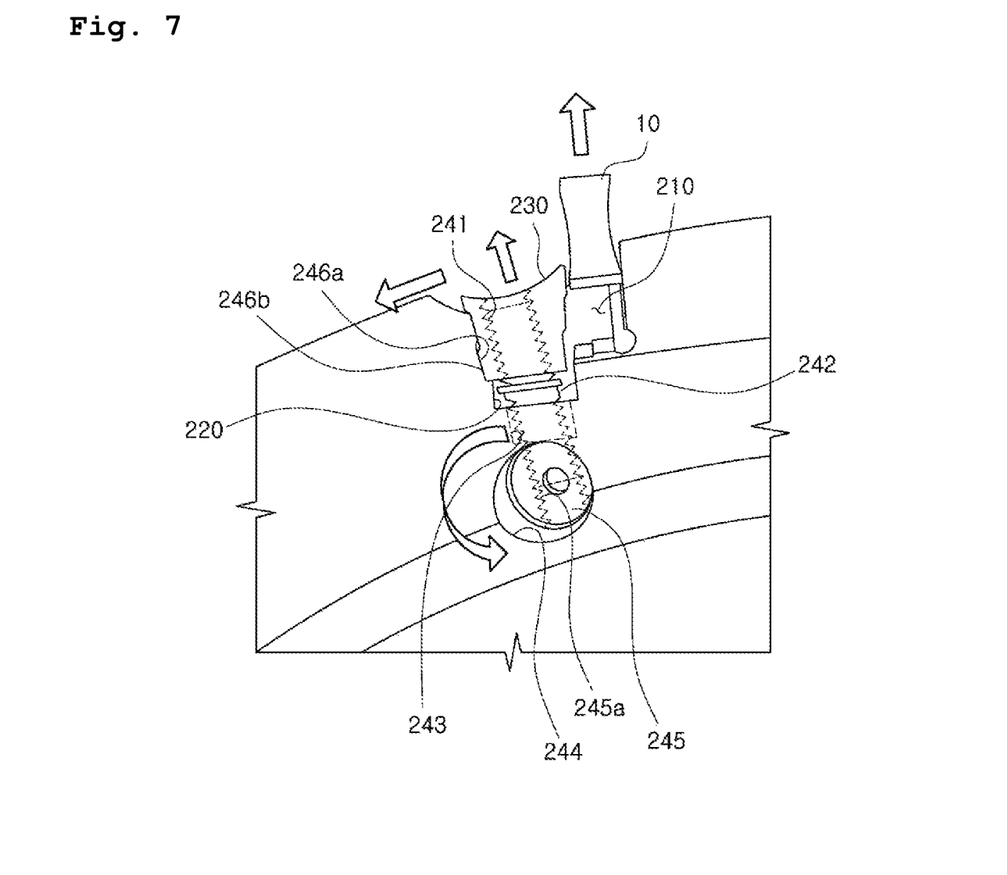
FIG. 7 is a view illustrating a process of detaching an insert with the apparatus for attaching or detaching insert of FIG. 3.

FIG. 6 is a view illustrating an insert being attached by the apparatus for attaching or detaching insert of FIG. 3, and FIG. 7 is a view illustrating a process of detaching an insert with the apparatus for attaching or detaching insert of FIG. 3.

First, as illustrated in FIG. 6, in a state that the insert 10 is retained in the insert receiving portion 210 by the wedge 230, the user may loosen the wedge 230 by un-screw the screw 242 in the reverse direction such that the first and second uneven surfaces 246a, 246b are at position where the first and second uneven surfaces 246a, 246b can be meshed (see FIG. 7). [At this time, only a specific portion of the screw 242 is withdrawn out of the engaging screw hole 245b, while the rest is kept in engagement in the engaging screw hole 245b. As illustrated in FIG. 7, the user may then pull the wedge 230 in the second direction (leftward direction based on FIG. 7) such that the wedge 230, and the hinge member 245a fastened with the wedge 230 through the screw 242 are rotated about the hinge receiving portion 244, the first and second uneven surfaces 246a, 246b are meshed with each other, and a gap is formed between the wedge 230 and the insert 10. Accordingly, without having to repeatedly rotate the screw 242, it is possible to make a sufficient gap by the rotation of the wedge 230 such that the user is able to detach the insert 10 and replace a new insert through the gap in a short time with convenience.

Further, as illustrated in FIG. 7, in a state that the wedge 230 is rotated to the second direction, when the user places a new insert 10 in the insert receiving portion 210 and pushes the wedge 230 in the first direction (rightward direction based on FIG. 7), the wedge 230, and the hinge member 245a fastened to the wedge 230 through the screw 230 are rotated about the hinge receiving portion 244. Then by the rotating the screw 242 in the forward direction as illustrated in FIG. 6, the wedge 230 is tightened such that the insert 10 received in the insert receiving portion 210 is pressed to the first direction (rightward direction based on FIG. 6). As a result, the insert 10 is retained by the wedge 230.

Hereinbelow, an apparatus for attaching or detaching an insert of a cutting tool according to another exemplary embodiment of the present disclosure will be described with reference to FIGS. 8 to 11.

Figure 8:
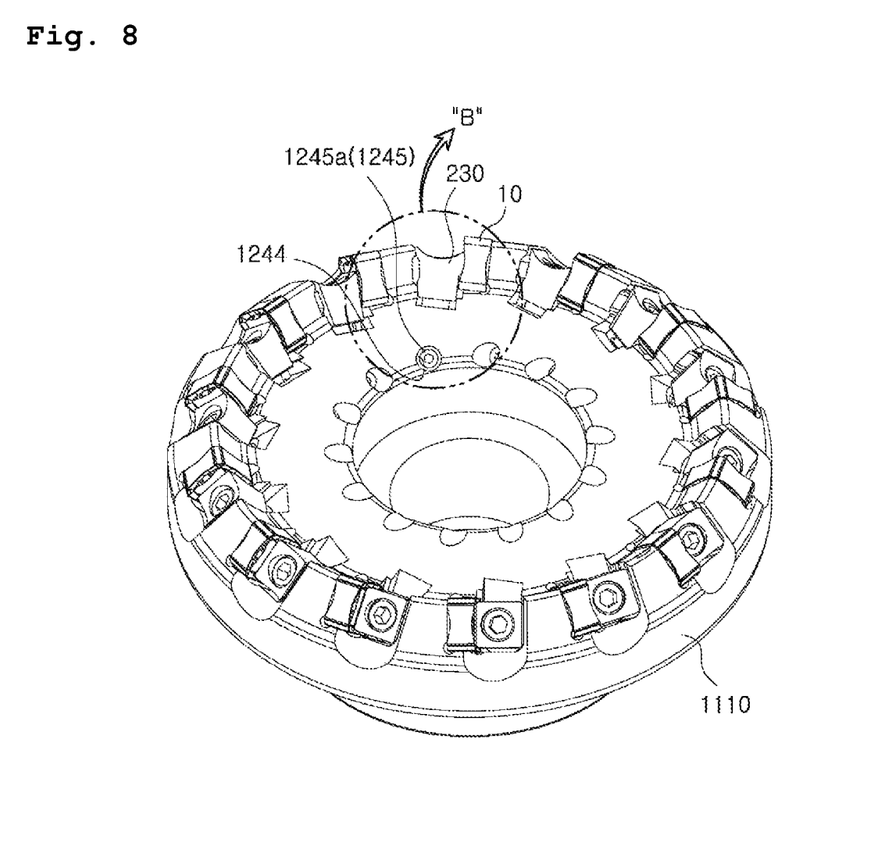
FIG. 8 is a schematic perspective view of a cutting tool including an apparatus for attaching or detaching insert of a cutting tool, according to another exemplary embodiment.
Figure 9:
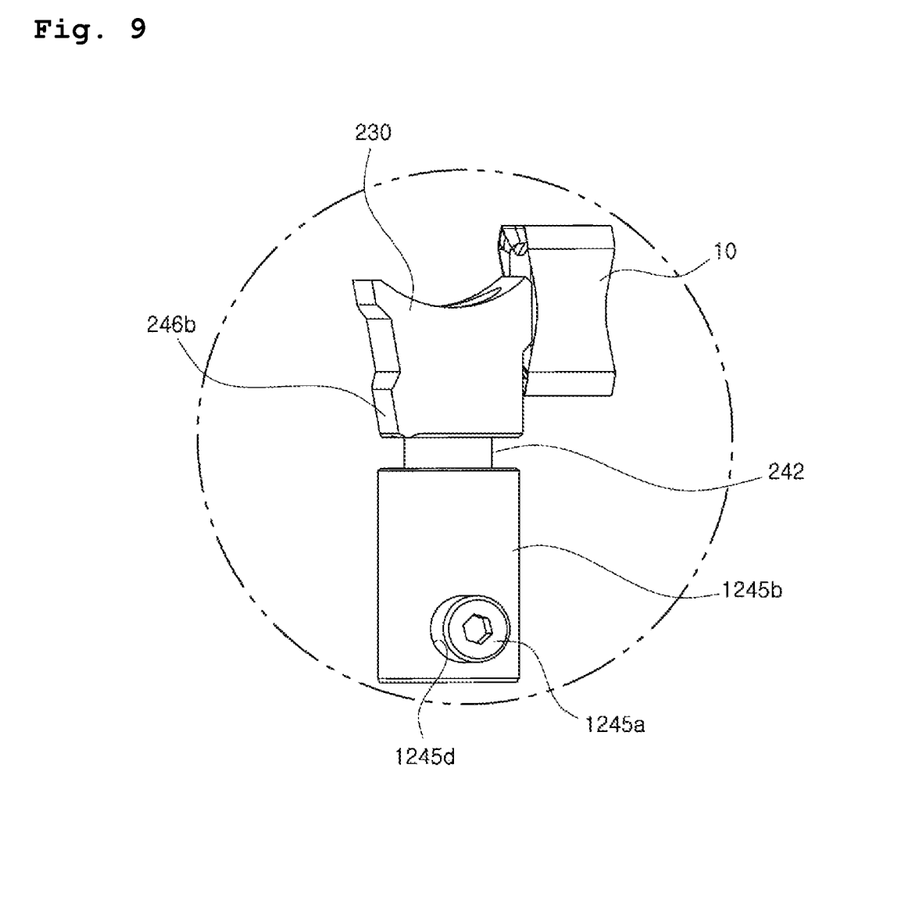
FIG. 9 is an expanded view illustrating the encircled area "B" (i.e., apparatus for attaching or detaching insert) of FIG. 8, in which the cutting tool body of FIG. 8 is omitted.

FIG. 8 is a schematic perspective view of a cutting tool including an apparatus for attaching or detaching insert of a cutting tool, according to another exemplary embodiment, and FIG. 9 is an expanded view illustrating the encircled area "B" (i.e., apparatus for attaching or detaching insert) of FIG. 8, in which the cutting tool body of FIG. 8 is omitted.

Figure 10:
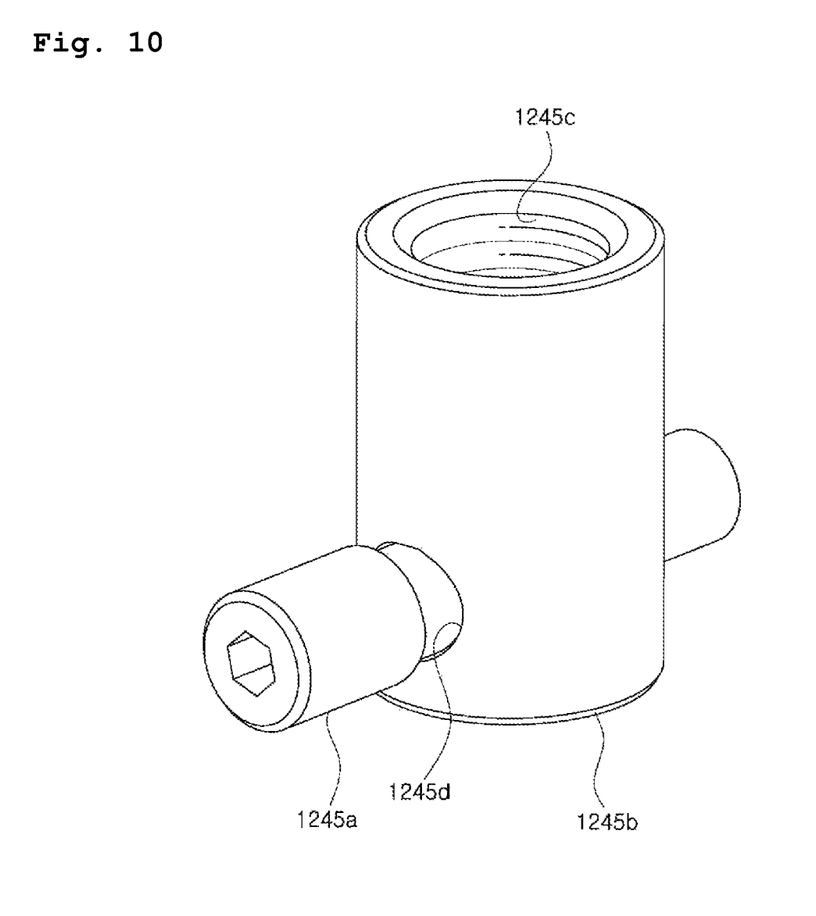
FIG. 10 is a perspective view illustrating a hinge of the apparatus for attaching or detaching insert of FIG. 8.
Figure 11:
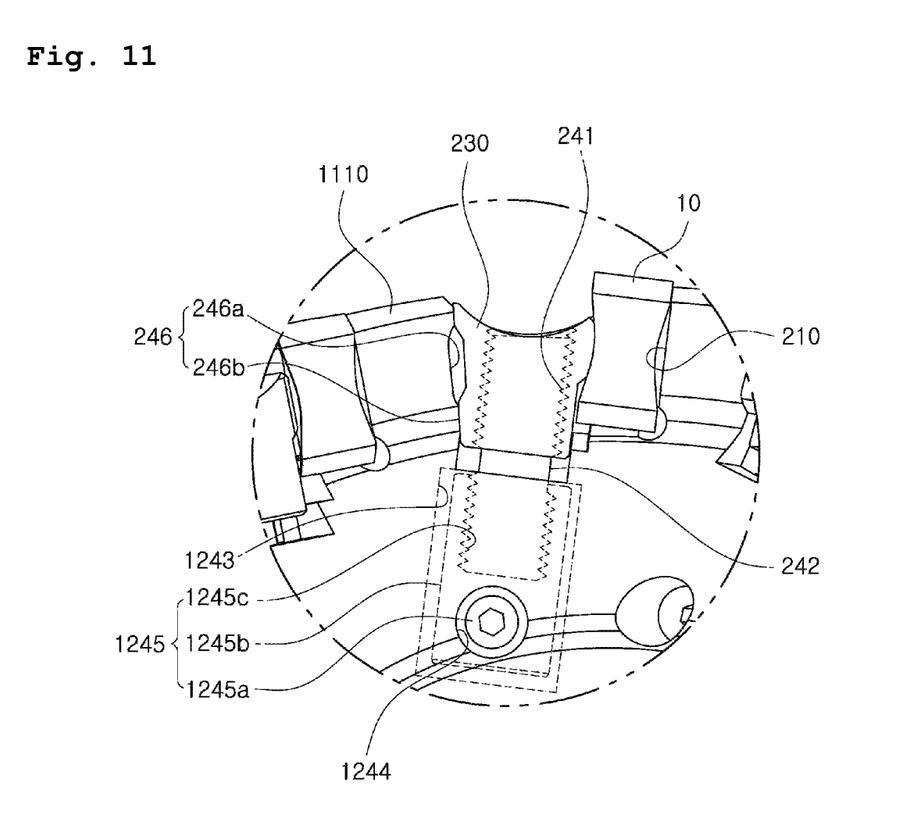
FIG. 11 is a schematic view illustrating the insert being attached with the apparatus for attaching or detaching insert of FIG. 8.

FIG. 10 is a perspective view illustrating a hinge of the apparatus for attaching or detaching insert of FIG. 8, and FIG. 11 is a schematic view illustrating the insert being attached with the apparatus for attaching or detaching insert of FIG. 8.

As illustrated in FIGS. 8 to 11, an apparatus for attaching or detaching an insert of a cutting tool according to another exemplary embodiment of the present disclosure may have the identical constitutions to those described above according to the exemplary embodiment, except for the size of the bottom through hole 1243, location and size of the hinge receiving portion 1244, and the hinge 1245. Accordingly, the bottom through hole 1243, the hinge receiving portion 1244, and the hinge 1245 will be mainly described below for the sake of brevity. Further, except for the bottom through hole 1243, the hinge receiving portion 1244, and the hinge 1245, the elements identical to those of the exemplary embodiment described above will be given the same reference numerals throughout.

As illustrated in FIG. 11, the bottom through hole 1243 is formed in the bottom surface of the wedge receiving portion 210, allows the screw 242 to pass therethrough, and has a greater size than a connect member 1245b of the hinge 1245. For example, in order to construct a greater-size structure, the bottom through hole 1243 may be designed to have a greater inner diameter than the outer diameter of the connect member 1245b. Further, the bottom through hole 1243 is positioned between the wedge screw hole 241 and a first connect screw hole 1245c of the hinge 1245 and thus serves to connect the wedge screw hole 241 with the first connect screw hole 1245c.

As illustrated in FIG. 11, a hinge pin 1245a of the hinge 1245 is inserted in the hinge receiving portion 1244 to thus serve as a center of rotation of the wedge 230. For example, the hinge receiving portion 1244 may take a cylindrical groove form and formed in an approximately vertical relationship with the bottom through hole 1243. Further, since the hinge receiving portion 1244 is where a relatively slender hinge pin 1245a is inserted, the hinge receiving portion 1244 may be realized in a smaller diameter than the hinge receiving portion 244 mentioned above in the previous exemplary embodiment.

As illustrated in FIG. 11, the hinge 1245 is provided in the hinge receiving portion 1244, rotatably at one side thereof, and as illustrated in FIGS. 9 and 10, the hinge 1245 may include a hinge pin 1245a, a connect member 1245b, and first and second connect screw holes 1245c, 1245d. Specifically, the hinge pin 1245a is directly received in the hinge receiving portion 1244 and rotatably therein, the connect member 1245b is received in the bottom through hole 1243 to play a role of connecting the hinge pin 1245a with the screw 242, the first connect screw hole 1245c is formed on one side of the connect member 1245b for screw-engagement with the screw 242, and the second connect screw hole 1245b is formed on the other side of the connect member 1245b for screw-engagement with the hinge pin 1245a.

Further, the bottom through hole 1243 described above may be formed in a size that allows the connect member 1245b to rotate while the wedge 230 is being rotated about the hinge pin 1245a and advanced through the space 246.

Further, the wedge screw hole 241, the bottom through hole 1243, and the first connect screw hole 1245c may be placed on the same line through the screw 242, and the hinge receiving portion 1244, the hinge pin 1245a, and the second connect screw hole 1245d may be placed in an approximately vertical relationship with the screw 242.

Meanwhile, as illustrated in FIGS. 8 and 11, an apparatus for attaching or detaching an insert of a cutting tool according to another exemplary embodiment described above additionally provides the connect member 1245b placed in the same direction as the screw 242, which is a difference from the exemplary embodiment described above. Accordingly, the distance between the bottom surface of the wedge receiving portion 220 and the hinge receiving portion 1244 can be increased due to the connect member 1245b such that the tool holder body 1110 can have enhanced durability. Further, engagement force with the screw 242 can also be enhanced, since the screw 242 can be fastened further into the connect member 1245b in a lengthwise direction through an end of the connect member 1245b.

Hereinbelow, an operation of an apparatus for attaching or detaching an insert of a cutting tool according to an exemplary embodiment of the present disclosure will be described with reference to FIGS. 11 and 12.

Figure 12:
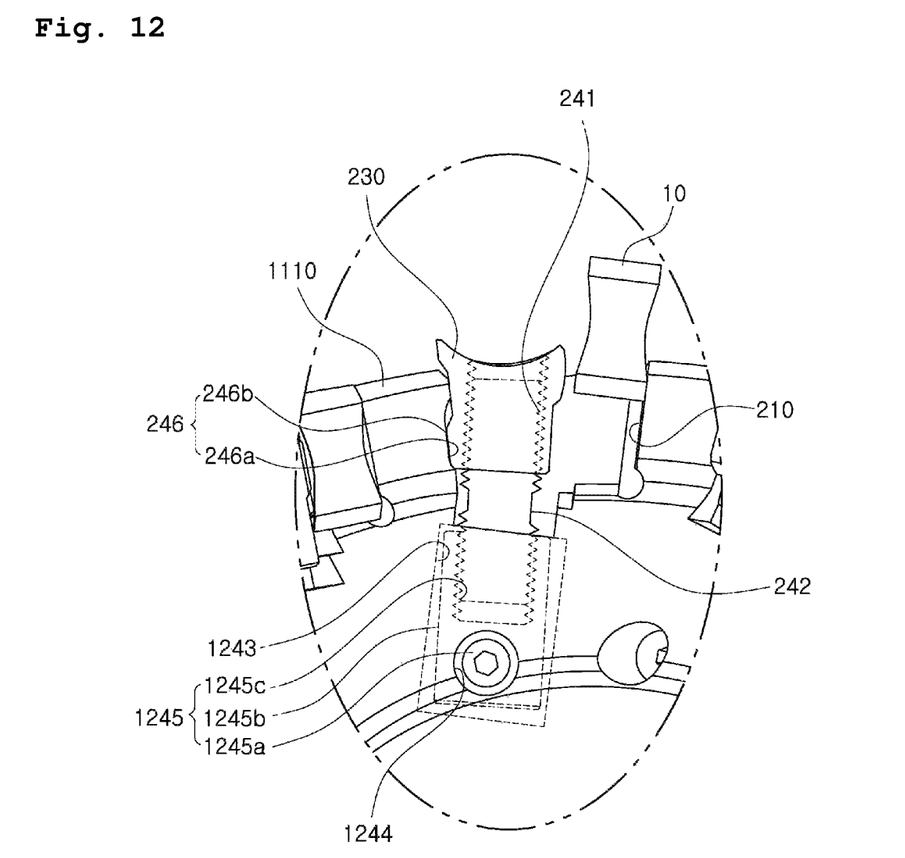
FIG. 12 is a schematic view illustrating a process of detaching an insert with the apparatus for attaching or detaching insert of FIG. 8.

FIG. 12 is a schematic view illustrating a process of detaching an insert with the apparatus for attaching or detaching insert of FIG. 8.

First, as illustrated in FIG. 11, in a state that the insert 10 is being retained in the insert receiving portion 210 by the wedge 230, the user may loosen the wedge 230 by unscrewing the screw 242 in a reverse direction. Accordingly, the first and second uneven surfaces 246a, 246b are placed in a position that the first and second uneven surfaces 246a, 246b can be meshed with each other (see FIG. 12). [At this time, only a certain portion of the screw 242 is withdrawn from the first connect screw hole 1245c, and the rest is kept being fastened in the first connect screw hole 1245c]. As illustrated in FIG. 12, the user may then pull the wedge 230 in the second direction (leftward direction based on FIG. 12) such that the wedge 230, and the connect member 1245b and the hinge pin 1245a of the hinge 1245 being fastened with the wedge 230 through the screw 242, are rotated about the hinge receiving portion 1244. Accordingly, the first and second uneven surfaces 246a, 246b are meshed with each other, and a gap is generated between the wedge 230 and the insert 10. Accordingly, without having to repeatedly rotate the screw 242, it is possible to make a sufficient gap by the rotation of the wedge 230 such that the user is able to detach the insert 10 and replace a new insert through the gap in a brief time with convenience.

Further, as illustrated in FIG. 12, in a state that the wedge 230 is being rotated in the second direction, the user may place a new insert 10 in the insert receiving portion 210, and pushes the wedge 230 in the first direction (rightward direction based on FIG. 12). Accordingly, the wedge 230, and the connect member 1245b and the hinge pin 1245a of the hinge 1245 being fastened with the wedge 230 through the screw 242, are rotated about the hinge receiving portion 244. As illustrated in FIG. 11, then the screw 242 is rotated in the forward direction, according to which the wedge 230 is tightened and the insert 10 received in the insert receiving portion 210 is pressed in the first direction (rightward direction based on FIG. 11). Accordingly, the insert 10 is retained by the wedge 230.

As described above, an apparatus for attaching or detaching an insert of a cutting tool according to various exemplary embodiments provide the following effects.

According to exemplary embodiments of the present disclosure, a technical configuration is provided, in which the wedge 230 is rotated in the wedge receiving portion 220 by the rotating unit 240. Accordingly, it is possible to replace the insert 10 easily and rapidly, by way of rotating the wedge 230 that retains the insert 10.

While exemplary embodiments are described in detail above, the scope of the present disclosure is not limited herein, but various changes and modified forms using the basic concept of the present disclosure as defined in the following claims also fall under the scope of the present disclosure.

INDUSTRIAL APPLICABILITY

The present disclosure relates to an apparatus for attaching or detaching an insert of a cutting tool, and therefore, has the industrial applicability as it is applicable to attaching an insert to the cutting tool or detaching the insert from the cutting tool.

What is claimed is:

1. An apparatus provided on a body of a cutting tool, for attaching or detaching an insert to or from the body of the cutting tool, the apparatus comprising:

an insert receiving portion formed in the body of the cutting tool to receive the insert therein;

a wedge receiving portion formed in the body of the cutting tool continuously after the insert receiving portion;

a wedge received in the wedge receiving portion; and a rotating unit configured to rotate the wedge in a first direction that faces the insert receiving portion, or to a second direction opposite the first direction, the rotating unit comprising:

a wedge screw hole formed through the wedge;

a screw screw-engaged in the wedge screw hole;

a bottom through hole formed in a bottom surface of the wedge receiving portion, the screw passing through the bottom through hole;

a hinge receiving portion formed in communication with the bottom through hole to serve as a center of rotation of the wedge; and a hinge provided in the hinge receiving portion with one side being rotatable, and screw-engaged with the screw.

2. The apparatus of claim 1, wherein the rotating unit further comprises a space to provide a clearance for the rotation of the wedge, when the wedge, in a loosened state, is rotated to the second direction.

3. The apparatus of claim 2, wherein the space comprises:

a first uneven surface formed on a surface of the wedge receiving portion that is placed in the second direction; and a second uneven surface formed on a surface of the wedge facing the second direction in order to correspond to the first uneven surface.

4. The apparatus of claim 3, wherein, when the wedge is in loosened state, the first and second uneven surfaces are meshed with each other, thus forming the clearance for the rotation, and when the wedge is in tightened state, the first and second uneven surfaces are not meshed with each other, thus pressing the insert.

5. The apparatus of claim 2, wherein the hinge comprises:

a hinge member rotatably provided in the hinge receiving portion; and an engage screw hole formed in the hinge member for screw-engagement with the screw.

6. The apparatus of claim 5, wherein the bottom through hole is formed in a size that allows the screw to rotate while the wedge is being rotated about the hinge member and advanced through the space.

7. The apparatus of claim 5, wherein the wedge screw hole, the bottom through hole, and the engage screw hole are placed on a same line through the screw, and the hinge receiving portion and the hinge member are placed vertically to the screw.

8. The apparatus of claim 2, wherein the hinge comprises:

a hinge pin rotatably provided in the hinge receiving portion;

a connect member received in the bottom through hole to connect the hinge pin with the screw;

a first connect screw hole formed on one side of the connect member such that the screw is screw-engaged therewith; and a second connect screw hole formed on the other side of the connect member such that the hinge pin is screw-engaged therewith.

9. The apparatus of claim 8, wherein the bottom through hole is formed in a size that allows the connect member to rotate while the wedge is being rotated about the hinge pin and advanced through the space.

10. The apparatus of claim 8, wherein the wedge screw hole, the bottom through hole, and the first connect screw hole are placed on a same line through the screw, and the hinge receiving portion, the hinge pin, and the second connect screw hole are placed vertically to the screw.

\* \* \* \* \*